July 29, 1941. E. P. BONE 2,250,620

REFLECTOR SIGNAL

Original Filed May 9, 1935 4 Sheets-Sheet 1

Inventor
Evan P. Bone
By Blackburn, Spencer & Hunt
Attorneys

July 29, 1941.　　　　E. P. BONE　　　　2,250,620
REFLECTOR SIGNAL
Original Filed May 9, 1935　　　4 Sheets-Sheet 2

Inventor
Evan P. Bone
By
Attorneys

July 29, 1941.  E. P. BONE  2,250,620
REFLECTOR SIGNAL
Original Filed May 9, 1935   4 Sheets-Sheet 3

Inventor
Evan P. Bone
By Blackmore, Spencer & Flint
Attorneys

July 29, 1941.  E. P. BONE  2,250,620
REFLECTOR SIGNAL
Original Filed May 9, 1935  4 Sheets-Sheet 4

Inventor
Evan P. Bone
By Blackmore, Spencer & Hurd
Attorneys

Patented July 29, 1941

2,250,620

UNITED STATES PATENT OFFICE 2,250,620

REFLECTOR SIGNAL

Evan P. Bone, Cincinnati, Ohio, assignor to General Motors Corporation, Detroit, Mich., a corporation of Delaware Original application May 9, 1935, Serial No. 20,593. Divided and this application May 2, 1938, Serial No. 205,459

6 Claims. (Cl. 88—78)

This invention has to do with auto-collimating reflex devices such as are for road signs and signals to return light from a source, such as an automobile headlight, back to the vicinity of that source so that anyone in that vicinity, for example, the occupants of the automobile, may see the sign or signal by the reflected light. Such devices are commonly used for road signs indicating danger, stop streets, curves, etc., and for advertising signs, and are also extensively used on vehicles to give an indication to the driver that there is a car ahead even though the usual tail light on that car be extinguished.

It is essential that such devices operate throughout a wide angular range to care for various conditions encountered on the road. For example, the car ahead carrying the reflex device may be proceeding around a curve, going up hill or down, or may be proceeding in a path parallel but to one side or the other of the following car or the reflex device when used as a sign along the road may be similarly positioned. In all of these positions the reflex device must operate to return a sufficient amount of light to the eye of the driver to give the necessary warning. The angular range within which a reflex device must be effective is determined by road conditions, and a careful study of these conditions indicates the need for a horizontal angular range of from 30° to 45° to each side of center combined with a vertical angular range of from 8 to 12°, both above and below the horizontal.

In most cases it will be found ample to provide an angular range of 10° up and 10° down and 30° to each side of center, thereby making the area of the field within which the reflex device must be effective approximately 1200 square degrees. In every one of the infinite number of positions the reflex device may occupy within this angular range it must serve to return a sufficient amount of light to the driver's eye to give the desired signal. In each and every such position the reflex device must project back upon the light source a beam pattern of sufficient spread to include both the light source and the driver's eye. The shape of this pattern will be determined primarily by the optical units employed, and the size of the pattern will be determined not only by the optical units employed, but also by the accuracy in manufacture. The more accurately the device is made, the smaller will be the pattern. The shape and size of the pattern projected by the reflex device will also vary with the angular position of the reflex device, and so will the intensity of the returned signal. In the commercial manufacture of reflex devices by production methods, it is desirable to reduce the size of the pattern formed by the reflected light as much as possible in order to have a signal of maximum strength.

Although the conditions encountered on the road do not require a total of more than 20° angular range in a vertical direction, the auto-collimators now in common use, such as the cube corner and the reflecting button, are usually symmetrically designed, having as great a range vertically as horizontally. Thus, while an angular range of 1200 square degrees cares for all conditions encountered in practice, present day devices are customarily designed for approximately 30° angular range in all directions, giving a total range of approximately 2800 square degrees.

My improved reflex device may be designed for the same angular range in all directions or for greater range horizontally than vertically. When designed in the last named manner it is capable of producing a signal of exceptional brightness and efficiency. In all its embodiments my improved reflex device is characterized by simplicity, ease of manufacture and insensitiveness to inaccuracies unavoidable in manufacture.

To provide the necessary horizontal angular range I make use of two vertically positioned reflecting surfaces arranged at an angle of 90°. Surfaces so arranged will, as is well known, return projected light back to the source throughout a wide horizontal angular range, although with some reduction in strength of the signal as the angle increases because of the fact that less light then strikes the device. Such devices, however, are ineffective over any substantial vertical angular range for the reason that upwardly or downwardly inclined incident rays are reflected at opposite vertical angles in accordance with the laws of reflection from plane surfaces. To overcome this defect I have employed means to condense the rays and bring them to a horizontal line focus, the condensed rays impinging on the 90° V reflector and being returned in the direction from which they came by the combined action of the reflector and condensing means. By suitably designing the condensing means it is possible to secure the necessary vertical angular range. The condensing action may be accomplished either by reflection or refraction but in the preferred form of the invention the condensing means takes the form of horizontal cylindrical lenses or flutes. The 90° V reflector ribs may be formed on the opposite side of the same glass on which the lenses or flutes are formed and the reflecting surface may be coated with silver or the like or left uncoated as desired. The reflecting efficiency, will of course, be increased by the coating. Alternatively the 90° V ribs may be formed of metal and may be spaced from the horizontal cylindrical lenses or flutes or the horizontal flutes may be formed on the ribs. In any design greatly improved efficiency will be obtained by so arranging the parts that the rays are brought to a focus in a line bisecting the 90° V ribs.

With my device superior performance may be obtained by designing it to operate effectively only within the angular range required by road conditions. This makes it possible to use the necessary optical units to greater advantage than has heretofore been possible in reflex devices, and to secure higher average efficiency. With reduced vertical range it is possible to employ condensing devices within limits of design within which optical aberration is substantially negligible. The importance of this will be appreciated when it is realized that optical aberration forces the designer of reflex buttons to compromises which constitute the chief source of loss of efficiency in this type of signal.

While the cube corner type of reflex is substantially free from the usual types of optical aberration, it suffers from an equivalent defect in the necessity for an exact angular relation between three reflecting surfaces, each of which acts upon every reflected ray in succession. Such devices are inherently difficult to manufacture owing to the angular cavities which characterize them. With my improved device but two reflecting surfaces are employed and as these take the form of simple 90° V grooves they may be more easily made and held within the necessary limits.

While my device may suffer to some extent from lack of the exact angular relation between the two reflecting surfaces, such defect affects the rays in only one plane,—the horizontal; while in the cube corner devices, such defect affects the rays in both horizontal and vertical planes. This advantage, coupled with the fact that my condensing means is substantially free from aberration throughout the reduced vertical range results in a large increase in the net resultant brightness.

My reflex devices present many other advantages. The employment of but two reflecting surfaces makes it possible to better confine the horizontal spread to the small amount desired. The V grooves in molds and dies may be readily machined with a high degree of accuracy and may be readily cleaned and polished. Other objects and advantages of the invention will be pointed out in the course of the following description.

Figure 29:
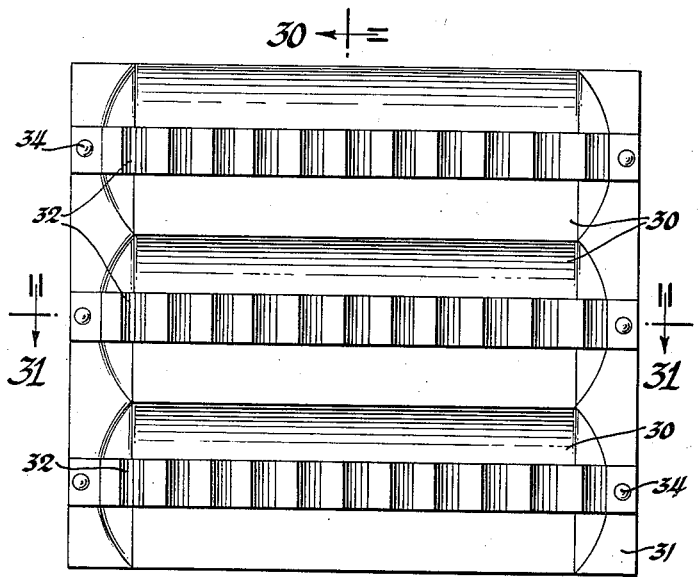
Figure 29 is a front elevation of a further modification.
Figure 30:
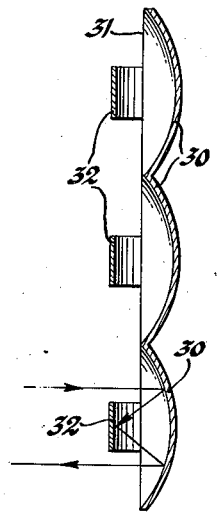
Figure 31:
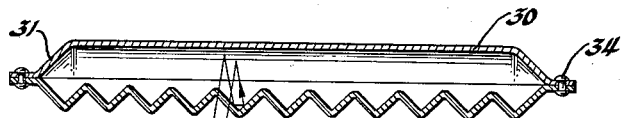

Figures 30 and 31 are sections on lines 30—30 and 31—31 of Figure 29.

Figure 32:
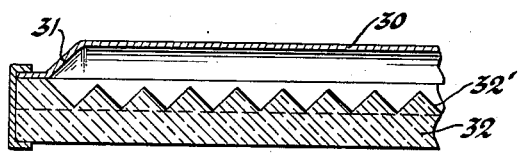

Figure 32 is a section similar to Figure 31 showing an additional modification.

Figure 1:
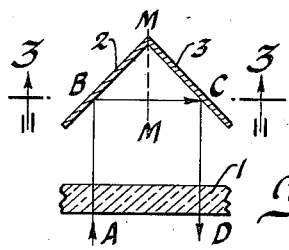
Figure 1 is a diagrammatic horizontal section through one form of my invention.
Figure 2:
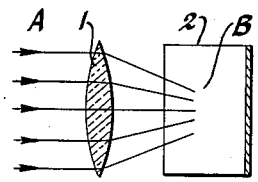
Figure 2 is a section taken substantially on line M—M of Figure 1, looking toward the left of that figure and showing typical incident rays A—B.
Figure 3:
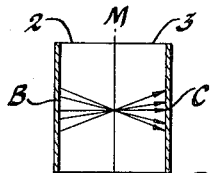
Figure 3 is a section taken on the line B—C of Figure 1.
Figure 4:
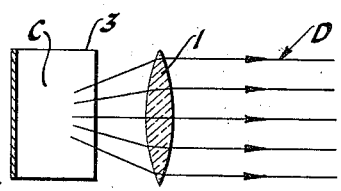
Figure 4 is a section taken substantially on line M—M of Figure 1, looking toward the right of that figure and showing only the reflected rays C—D.
Figure 5:
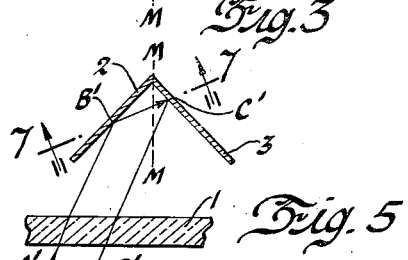
Figures 5 to 8 are views corresponding to Figures 1 to 4, respectively, but showing the action of the same device with angularly incident horizontal rays.
Figure 6:
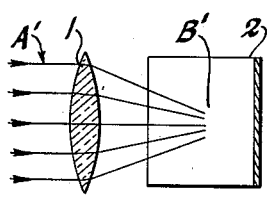
Figure 7:
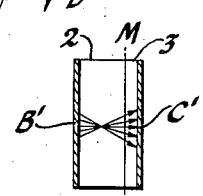

Figures 1 to 4 show diagrammatically the operation of one form of my reflex device. Here 1 indicates a horizontal flute element in the form of a cylindrical lens and 2 and 3 indicate the cooperating 90° V reflector. As shown in the horizontal section in Figure 1, ray A—B is reflected to C and is again reflected, emerging as ray C—D parallel to the incident ray A—B. It will be understood, of course, that the same action takes place in a reverse direction in the case of a ray of light incident along the path D—C. As shown in Figure 2, the flute 1 condenses the incident rays on the reflector section 2, and as shown in Figure 3, the rays are reflected and brought to a focus at a point in the plane M—M which bisects the 90° angle of the reflector. The rays thereafter diverge, striking the reflector section 3, as indicated at C, whereupon as shown in Figure 4, the rays are again reflected, diverging outwardly and passing through the lens 1 which refracts them into paths parallel to the direction of incidence. It will be apparent that with the construction shown, the focal length of the flute 1 is the distance along the central ray from the flute 1 to B to the focal point in the bisecting plane M—M.

There is illustrated in Figures 1 to 4, the action of the system on a single vertical sheet of rays incident parallel to the bisecting plane M—M. It will be apparent that with this system each vertical sheet of rays parallel to the one illustrated will be similarly brought to a focus at a point in the bisecting plane since the distance from the point of incidence on the lens to the point of incidence on the reflector and thence over to the median plane is the same for all such rays. All such rays will, of course, be reflected back in a direction parallel to the direction of incidence, just as in the case of the rays A—B—C—D.

Figure 8:
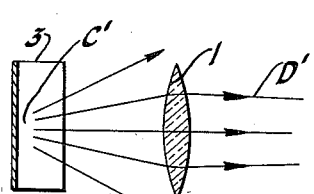
Figure 9:
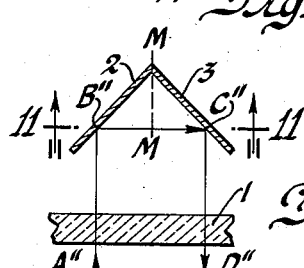
Figures 9 to 12 are a set of views corresponding to Figures 1 to 4, respectively, but showing the action of the device with downwardly inclined rays.
Figure 10:
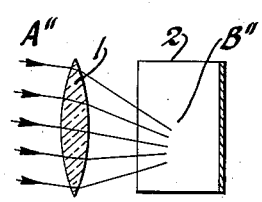
Figure 11:
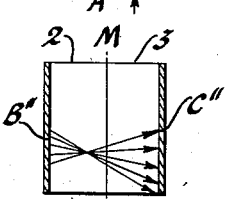

In Figures 5 to 8 there is shown the action of the system on horizontal rays incident in a vertical plane making an angle with the bisecting plane M—M. It will be noted that owing to the fact that the path of the incident rays is at an angle to the axis of the flute, the flute will act as a lens of shorter focal length, and this combined with the increased distance from A' to B' to the bisecting plane M—M along the path of the reflected rays will cause the focal point to lie to the left of the plane M—M with the consequence that, as shown in Figure 8, some of the rays reflected from surface 3 will miss the flute I altogether, while those that strike it will emerge at slight angles to each other, although in the general direction of incidence. It is apparent from a consideration of these figures that the construction is somewhat less efficient in the case of rays incident at an angle to the median plane, but such efficiency is still relatively high.

Figure 12:
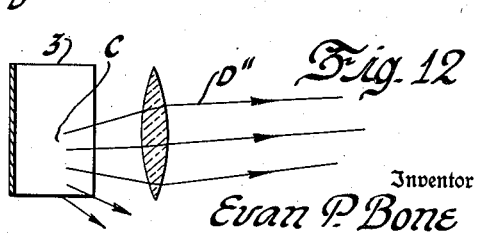
Figure 13:
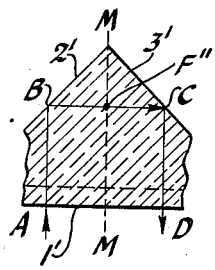
Figure 13 is a section corresponding to Figure 1, but showing an embodiment of my invention which may be made entirely of glass.

Figures 9 to 12 illustrate the action in the case of rays parallel to plane M—M but incident at an angle with the horizontal. As shown in these figures owing to the somewhat longer path of travel from the lens to the reflector at B'' and thence to the bisecting plane M—M, the rays come to a focus at a point to the left of the median plane so that, as shown in Figure 12, some of the rays miss the lower end of the flute I altogether, while the remainder pass through the lens and issue at slightly divergent angles, but in the general direction of incidence. It will be observed, of course, that the efficiency of the device, as illustrated, is somewhat less for rays incident at vertical angles than for horizontal rays incident parallel to the median plane.

It will be understood, of course, that in the case of rays incident both at angles to the bisecting plane M—M and to the horizontal, there will be some of the action shown in Figures 5 to 8 combined with some of the action shown in Figures 9 to 12, but, in general, within the range of the device there will be a substantial amount of auto-collimation for any such rays incident within the range for which the device is designed.

It will be understood, of course, that all of the elements in the above described construction are subject to design to produce the results desired. While it is true that maximum collimation is obtained when the rays are brought to a focus in the bisecting plane M—M, it may be desirable to employ flutes I of somewhat greater focal length so as to reduce the efficiency in the case of rays received head on, but to increase the efficiency in the case of rays incident at an angle. Some such compromise in focal length will be found in most cases to give the most desirable operation.

I prefer to employ cylindrical lenses with a focal length substantially equal to or slightly more than the maximum distance between the outside surface of the lens and the most remote part of the reflecting surfaces. In the design of these devices it is also important that the height $h$ of the flute elements be sufficient to give the vertical angular range of reflexing required. In general, the height $h$ of the lens elements should conform to the equation $$h = 2f \tan \theta/2$$

Here $f$ is a focal length of the lens, and also the maximum distance between lens and reflectors, and $\theta$ is the total vertical angular range of reflexing required. The height $h$ of the lens should not greatly exceed this value so as to avoid too much optical aberration with the resultant reduction in concentration of the reflected light. It is also apparent that if desired the flute elements could be designed to produce a focal area rather than a line focus, this being done with suitable curves or combinations of curves.

Figure 14:
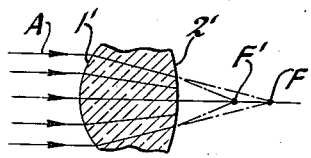
Figure 14 is a section along line A—B of Figure 13 looking toward the left.
Figure 15:
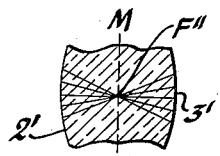
Figure 15 is a section on line B—C looking toward the rear.
Figure 16:
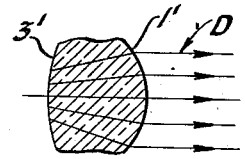
Figure 16 is a section on line C—D looking toward the right of Figure 13.
Figure 17:
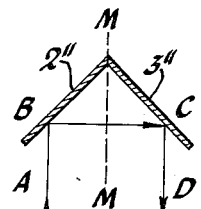
Figures 17 to 20 are a set of views corresponding to Figures 1 to 4 showing a further modification made of metal.
Figure 18:
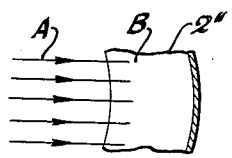
Figure 19:
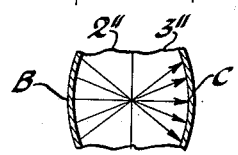
Figure 20:

In Figures 13 to 16 there is shown a modification in which the space between the outside of the flute and the reflector is filled with glass. In such constructions, of course, the reflecting surfaces 2'—3' may be formed by plating directly on the glass if desired. This device will operate without a special reflecting surface within the range of angles within which substantially total internal reflection is obtainable with the kind of glass employed. In the construction of Figures 13 to 16 the reflectors 2'—3' are also modified in that they take the form of concave horizontal flutes, as shown in Figures 14 to 16, so that the focal length of the system is the combination of the focal length of the cylindrical lens or flute I' and of the cooperating concave flute on the reflector 2' or 3'. In Figure 14, F indicates the focal length of the flute I' assuming that there is no change in medium through which the light passes after entering the glass while F' indicates the focal length of the combination of flute I' and reflector 2'. Owing to reflection at B the rays illustrated will of course be brought to a focus at F''. This construction is subject to the same modifications referred to in connection with preceding form. In addition, the concave flutes may be modified to correct for aberration as described in connection with the next form, or if preferred they may be omitted altogether.

In Figures 17 to 20 there is shown a further modification in which the only flutes employed are on the 90° reflecting surfaces 2''—3''. The construction illustrated may, of course, be made of metal formed by stamping, or rolling, or, if desired, could be made of glass having one plane surface and the opposite surface formed with ribs of the configuration shown in Figures 17 to 20, the surfaces of the ribs preferably, although not necessarily, being coated with metal or otherwise provided with a close fitting metallic reflecting surface. In the construction illustrated it will be clear that the auto-collimating action is substantially the same as in the form shown in Figures 1 to 4. However, it is to be noted that if the reflecting flutes have the same curvature throughout their length the light rays will be brought to focus along lines parallel to the flute axes, such lines intersecting the median plane M—M at a single point only. Consequently there will be greater optical aberration with this construction than with the constructions previously described. This objection may, of course, be overcome by employing reflecting flutes with focal lengths that increase with the distance from the apex of the 90° reflectors of which they form a part. However, even though uniform curvatures be employed on the reflecting elements with some increase in aberration and loss in efficiency, this form of the invention has the advantage of low cost of manufacture, for strips and sheets of this configuration can readily be made by stamping and rolling at low cost. With this form of the invention there is likewise opportunity for variation in focal length of the reflecting flutes to produce the results desired. There will likewise be the same dispersion of light in the case of angularly incident rays, and, in general, the dispersion will be greater, for assuming the same tolerances and order of errors in both cases, when a reflecting surface is angularly displaced 1° the reflected ray is displaced 2° from the intended direction, while if a refracting surface, such as the flute 1, of Figures 1 to 4, is angularly displaced 1°, the refracted ray is displaced only approximately $\frac{2}{5}°$ from the direction indicated. Thus, where reflection alone is relied upon to produce the same bending of rays as can be accomplished wholly by refraction, the tendency to distortion is approximately five times as great. Since in my preferred construction the bending is accomplished partially by refraction and partially by reflection, the tendency to distortion is correspondingly reduced.

Figure 21:
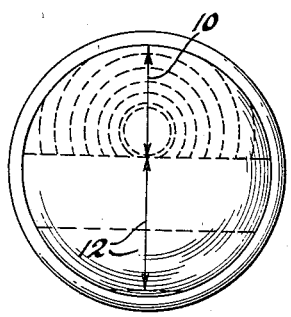
Figure 21 is a front elevation of a tail lamp showing one way in which my invention is embodied.
Figure 22:
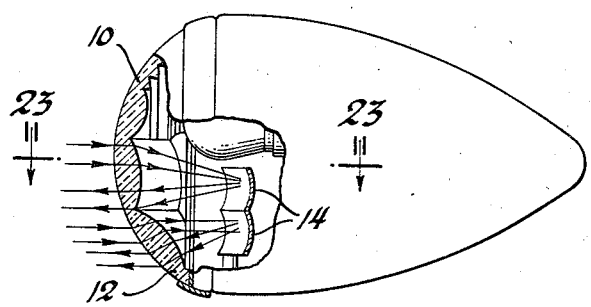
Figure 22 is a side elevation of Figure 21, showing in part, a vertical longitudinal section through the tail lamp.
Figure 23:
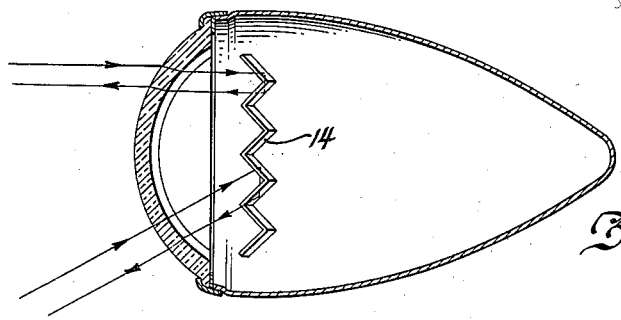
Figure 23 is a horizontal longitudinal section through the same tail lamp.

In Figures 21 to 23 I have shown my invention embodied in an automobile tail lamp. Here 10 indicates a lens, the upper part of which may be provided with the usual Fresnel and catadioptric rings to concentrate the light, while the lower portion is provided with horizontal flutes 12 designed to focus incident light on the reflecting ribs 14. The ribs 14 as shown in Figure 22 may be provided with focusing flutes to further condense the light, or these may be omitted if preferred. Figure 23 illustrates the action of the device with head-on and angularly incident rays. The construction is optically the same as that of Figures 1 to 4, except that the reflecting ribs 14 are fluted as in the forms shown in Figures 13 to 20. The surfaces of the flutes 12 in this form of the invention are preferably corrected so as to overcome optical aberration. These flute surfaces also have sharper curvature from the center outwardly both vertically and laterally to obtain shorter focal lengths toward the edges, to compensate for the varying distances of the lens from the reflector. In this construction, of course, the arrangement is preferably such that substantially horizontal rays are brought to a focus in a line lying in the median plane.

An advantage of this construction over the other reflex devices shown is that the structure can be made on a larger scale so that the mechanical inaccuracies are not so effective in distorting the reflected light. The corrected curvature and other refinements are thereby warranted. In the usual pressed glass reflex device, a beam of light several hundred feet long is controlled on the short end of a fulcrum, usually only about $\frac{1}{8}''$ long. In the tail light illustrated the short end of the lever of the light beam, that is, the distance between the incident surface of the flute and the focus, along the path of a light ray, can be increased to some $2''$ or so, and as a consequence the construction is not nearly so sensitive to inaccuracies in manufacture.

The correction of the curvature of the condensing flutes used in the various embodiments of my invention will effect a very considerable increase in brightness. The principles involved in such correction are briefly as follows:

The ideal condition for our converging lens obtains when all of the rays come to a focus in the bisecting plane M—M, Figure 1. It is common practice in the design of lenses to use a simple curvature which is a circle in cross section. But with the use of a circle an outside ray, such as the top or bottom ray of Figure 2, strikes the surface of the glass at a greater angle than does the central ray. As a consequence of this, the outer rays are refracted more and fall short of the desired focus in the plane M—M. This discrepancy is usually called spherical aberration. It may be noted here that most optical surfaces are surfaces of revolution, the circle when revolved, forming a sphere and hence the name "spherical aberration." In our case of a cylindrical lens we have the same effect from our circular cross section although it is not actually spherical.

In the present construction we have aberrations which are additional to spherical aberration but they are all mostly caused by the same general effect of the angular rays falling short of the intended focus. Thus, the rays A'—B'—C'—D' from the side angles as shown on Figures 5 to 8, fall further short of the plane M—M. Also, the rays incident from an upward angle shown on Figures 9 to 12 have a further tendency to fall short of the plane M—M. Moreover, in manufacture, the spacing between the converging means 1 and the reflector 2, 3, may be inaccurate and cause the point at which the rays tend to focus to miss the plane M—M altogether.

The combination of all the above effects which tend to keep the rays from coming to the intended focus in plane M—M, may be considered as general optical aberrations. The first mentioned spherical aberration is only a part of the general aberrations. Spherical aberration can be completely corrected for by changing the circular cross section to some adapted form of a "Cartesian oval" such as an ellipse or parabola. Such a corrected or aspherical curvature may bring all of the rays A, incident head-on, to a focus in plane M—M, as illustrated in Figures 2 and 3. This correction is well known in the art. However, even with this correction, when rays are not head-on but incident at an angle they again do not come to a precise focus in the plane M—M. I preferably make use of a corrected aspherical curvature to better correct for aberrations in general from all of the above causes and not merely to correct for spherical aberration. Considering these, my preferred curve is arrived at by mathematical optics. My curve may or may not be approximated by some simple mathematical curve, such as a circle, parabola or ellipse, but more often is found in some unnamed form.

Figure 24:
Figure 24 is a front elevation of a portion of a typical commercial embodiment of my invention.
Figure 25:
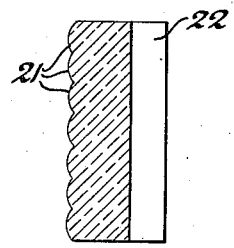
Figure 25 is a section taken on line 25—25 of Figure 24.
Figure 26:
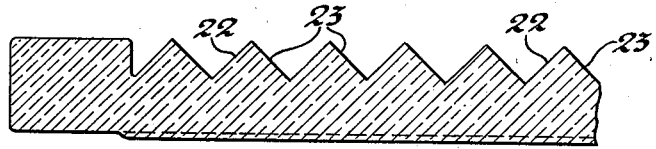
Figure 26 is a section taken on line 26—26 of Figure 24.

In Figures 24 to 26 I have shown a commercial embodiment of my invention as it may be made when pressed out of glass. Optically the construction is the same in principle as the form shown in Figures 13 to 16 except that the reflecting surfaces indicated at 22 and 23 are free from flutes. To secure maximum efficiency the condensing flutes 21 should be given special curvature to correct for optical aberration as above explained. The thickness of the glass should be maintained within close limits to insure that the rays will come to a focus in the plane bisecting the 90° angle between the reflector surfaces. A reflecting coating on the surfaces of the V rib will also increase the efficiency of the device as well as greatly increase its angular range.

Figure 27:
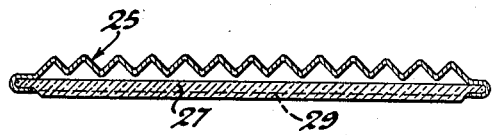
Figure 27 is a section similar to Figure 26 showing a modification.

In Figure 27 I have shown an even more efficient design, corresponding optically to that shown in Figures 1 to 12, in which the 90° V grooves are formed in a sheet metal plate 25 secured to the back of the glass 27 carrying the condensing flutes or lenses 29 as by spinning the edges of the metal about the glass. This construction will be more efficient because a pressed metal reflecting surface may be readily made freer from surface irregularities than a pressed glass surface such as shown in Figures 24 to 26. Another advantage of this construction arises from the fact that it is not so sensitive to variations in the thickness of the glass since the position of the focus of incident rays is determined primarily by the overall distance from the front of the glass to the front of the reflector rather than by the proportion of the length of the path of the rays through glass to the length of the path of the rays through the air between the glass and the reflector, and the said overall distance may be accurately maintained in assembly.

Figure 28:
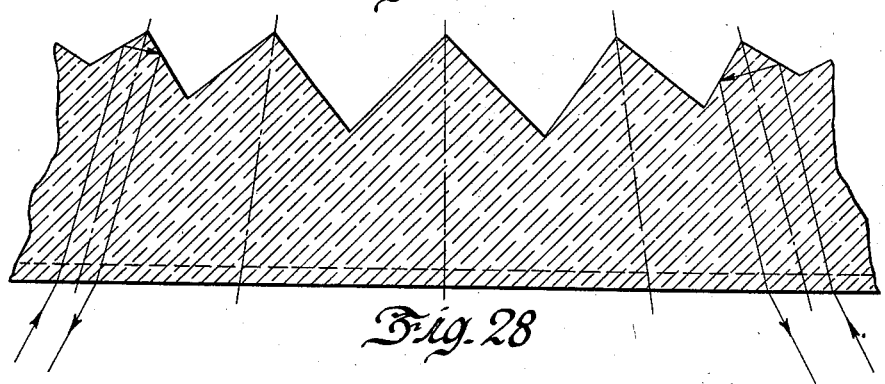
Figure 28 is a horizontal section through a further modified form.

In Figure 28 I have shown a modification of the construction shown in Figure 26 in that the orientation of the reflecting V ribs is varied. This is of especial advantage when the back of the ribs is not provided with a reflecting coating for then the horizontal angular range is limited by the failure of the ribs to internally reflect light at the wider angles. By orienting some of the ribs at an angle to normal to the glass they are effective to return light at the wider angles although their effectiveness in the case of head-on or oppositely inclined incident rays is considerably diminished.

In Figures 29 to 31 I have disclosed an application of my invention which employs reflection only but in which the condensing means is not superimposed on the 90° V ribs. Condensing is done by employing horizontal cylindrical reflecting flutes to bring the incident rays to a line focus. The condensed rays are directed on vertical 90° V ribs arranged in front of the flutes, the ribs acting in conjunction with the flutes to return the rays in the direction of incidence. The cylindrical flutes 30 are preferably formed by stamping a sheet of metal indicated at 31, and the 90° V ribs are formed by suitably stamping narrow strips of metal indicated at 32. The strips 32 are secured to the sheet 31 by riveting as indicated at 34, or in any other suitable manner. The flutes and ribs are preferably so spaced that the condensed rays are brought to a focus in the plane bisecting the angles of the ribs so as to give maximum efficiency.

It will be noted by reference to Figure 31 that the strips 32 present 90° reflecting surfaces on their outer sides as well as on their inner sides so that if the outer surface is silvered it will of itself act as a simple 90° V reflex device with respect to normally incident rays. As in the other forms of my invention the vertical angular range of this reflex device may be increased by placing a horizontal condensing flute in front of it as in the form shown in Figures 1 to 4.

Instead of making the strips of 90° V ribs out of sheet metal they may be formed upon a cover glass as indicated at 32' in Figure 32, preferably being silvered to give the necessary high reflecting efficiency. Between the strips the glass of course should be plane.

For best results the radius of curvature of the cylindrical flutes 30 should be approximately twice the distance from the 90° V ribs to the apex of the flutes, and the width of the flutes should be approximately three times the width of the V ribs.

It will be understood that my invention is capable of considerable modification in addition to those illustrated. The reflex devices may be designed for the range of angularity desired, and the spread of the pattern may be increased if desired by introducing inaccuracies in the form of very slightly divergent angles, warped or irregular surfaces and so on, but in general it will be found desirable to make the devices as accurately as is possible in large production to secure maximum efficiency.

While I have emphasized the usefulness of my reflex device for road service and have emphasized different lateral and vertical angular ranges it will be appreciated that it may be used for other purposes in which other angular ranges may be desired. Thus it may be readily employed for greater vertical range than horizontal range by simply rotating it 90°.

It will be understood, therefore, that the terms vertical and horizontal as used in this specification are to be construed in a relative sense and not in an absolute sense.

It is possible that in some uses it may be desirable to depart from an angle of exactly 90° between the condensing flutes and the V ribs to vary the field within which the device is effective, although with some slight loss in efficiency, and all such modifications come within the scope of my invention.

This application is a division of my copending application Serial No. 20,593, filed May 9, 1935 for Reflector signal.

I claim:

1. An auto-collimating device comprising a pair of substantially vertically extending reflecting surfaces arranged at substantially right angles to each other, said surfaces being formed to provide horizontal concave flutes having axes lying in the same plane to condense the incident parallel light rays, said flutes being shaped to bring incident light to a focus between said surfaces.

2. An auto-collimating reflector comprising a pair of substantially vertically extending metallic reflecting surfaces arranged at substantially a right angle to each other, said surfaces being formed to provide horizontal flutes to condense incident parallel light rays and focus the same in the vertical plane substantially midway between said surfaces.

3. An auto-collimating reflector comprising a pair of substantially vertically extending metallic reflecting surfaces arranged at substantially a right angle to each other and metallic horizontally extending concave portions operatively associated with said reflecting surfaces, said concave portions being arranged to condense incident parallel light rays and bring the same to a focus in a vertical plane between said reflecting surfaces.

4. An auto-collimating reflector comprising a pair of vertically extending metallic reflecting surfaces arranged at substantially a right angle to each other and horizontally extending concave metallic members associated with said vertically extending reflecting surfaces, said concave members being arranged to condense incident parallel light rays and bring the same to a focus in a vertical plane between said reflecting surfaces.

5. An auto-collimating device comprising a pair of substantially vertically extending metallic reflecting surfaces arranged at substantially a right angle to each other, said surfaces being formed to provide horizontal concave flutes lying in the same plane to condense incident parallel light rays, said flutes being shaped to bring incident parallel light rays to a focus in a vertical plane substantially midway between said surfaces.

6. An auto-collimating device comprising a pair of substantially vertically extending metallic reflecting surfaces arranged at substantially right angles to each other and metallic horizontally extending concave portions operatively associated with said vertically extending metallic surfaces, said concave portions being arranged to condense incident parallel light rays and bring the same to a focus in a vertical plane substantially midway between said reflecting surfaces.

EVAN P. BONE.